United States Patent [19]

Hobbs

[11] 4,232,567
[45] Nov. 11, 1980

[54] POWER TRANSMISSION APPARATUS

[75] Inventor: Howard F. Hobbs, Napton, England

[73] Assignee: Variable Kinetic Drives Limited, England

[21] Appl. No.: 799,087

[22] Filed: May 20, 1977

[51] Int. Cl.³ .................... F16H 47/04; F16H 47/08; F16H 37/06

[52] U.S. Cl. ...................................... 74/677; 74/682; 74/688

[58] Field of Search ................. 74/682, 688, 677

[56] References Cited

U.S. PATENT DOCUMENTS

| | | | |
|---|---|---|---|
| 2,969,694 | 1/1961 | Harmon et al. | 74/677 |
| 3,048,057 | 8/1962 | Dodge | 74/688 X |
| 3,270,586 | 9/1966 | Tuck et al. | 74/677 |
| 3,296,891 | 1/1967 | Tuck | 74/688 X |
| 3,359,827 | 12/1967 | Chapman, Jr. et al. | 74/688 X |
| 3,789,697 | 2/1974 | Hobbs | 74/677 |
| 4,056,986 | 11/1977 | Hobbs | 74/688 |

*Primary Examiner*—Leslie Braun
*Attorney, Agent, or Firm*—William Drucker

[57] ABSTRACT

The invention provides a power transmission apparatus which includes a hydraulic torque converter and mechanical gears. The torque converter includes a circulatory turbine in addition to the usual output turbine. The mechanical gears include first, second and third gearings. The first gearing connects the circulatory turbine to the converter input shaft. The second gearing connects the first gearing to the converter output member through a unidirectional freewheel. The third gearing connects the second gearing to an output member of the apparatus.

3 Claims, 9 Drawing Figures

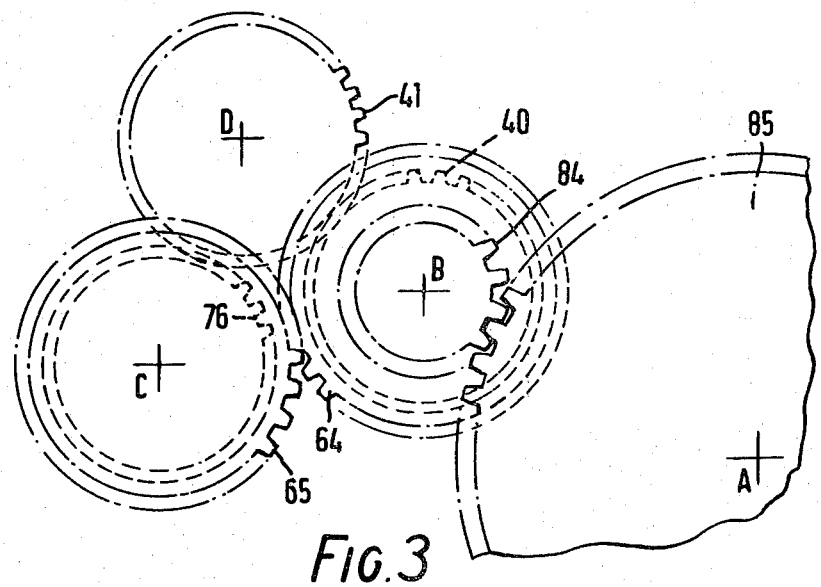
FIG. 3
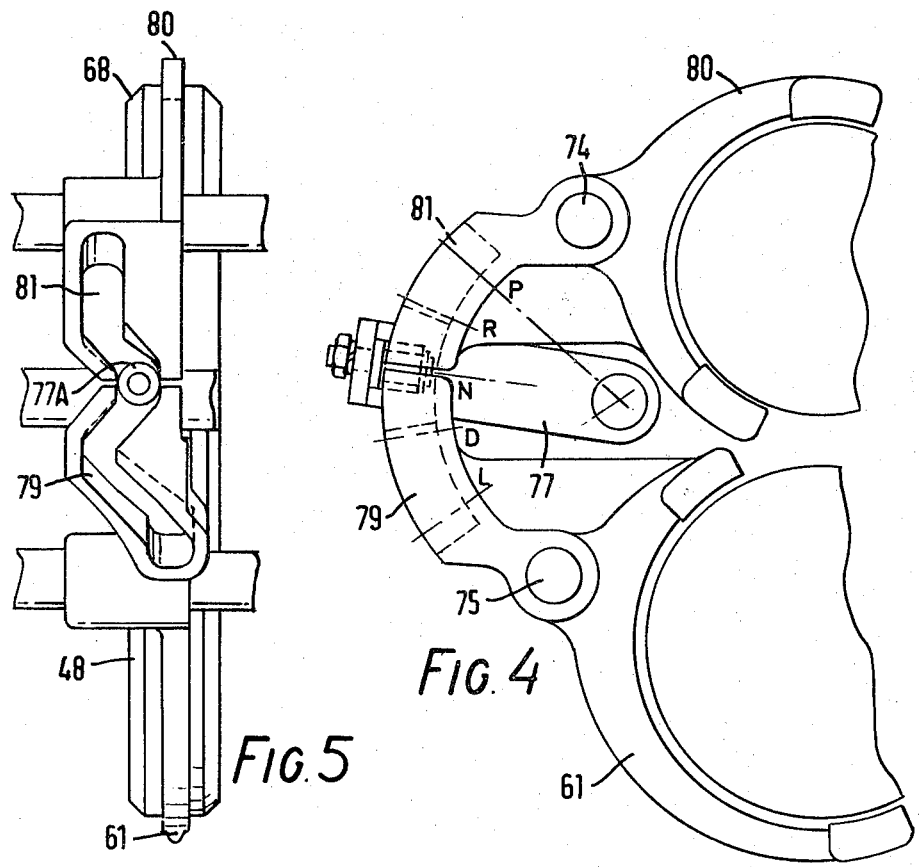
FIG. 5
FIG. 4

POWER TRANSMISSION APPARATUS

This invention relates to power transmission apparatus comprising a hydro-kinetic torque converter combined with a change speed gearing and is especially applicable to the apparatus as described in the specifications of British Pat. Nos. 1199521 and 1347045.

The apparatus claimed in specification No. 1347045 comprises an input shaft, an impeller connected to the input shaft, an output shaft, an output turbine connected to the output shaft, a circulatory turbine disposed in the flow path between the impeller and output turbine, a first gearing and a second gearing, said first gearing connecting the circulatory turbine to the impeller; said second gearing being connected with the first gearing, the output shaft and a stationary part; whereby the first gearing can transmit driving torque from the said circulatory turbine to the said impeller and driving torque increased by the second gearing is transmitted from the circulatory turbine through said first gearing to the output shaft and reaction torque is imparted to said stationary part, so that the said circulatory turbine will always rotate when the impeller rotates and in the same direction but at a speed less than that of the impeller at a lower speed part of the range of speeds of the output shaft and at a speed greater than that of the impeller at a higher speed part of said range.

It is often required to provide means for reversing the direction of rotation of the output shaft and also to provide a speed reducing means between a torque converter and the output shaft so as to enable the engine to be driven from the output shaft at increased speeds and provide 'engine braking'for example when a converter is used in a motor vehicle and when descending a steep hill. Such reducing means can also be used to provide increased driving torque on the output shaft such as when required to tow a caravan or boat on a very steep gradient.

Means to achieve these requirements can be bulky and complicated.

An object of the present invention is to simplify the construction of a hydro-kinetic torque converter apparatus having reversing and engine braking means.

Many small motor cars now use an engine placed transversely and driving the front or rear wheels from the layshaft of a gear-box.

The present invention is particularly suited to this construction.

According to the invention a power transmission apparatus may comprise a torque converter having an input shaft, an impeller connected to the input shaft, an output turbine connected to an output sleeve, and a reactor and a circulatory turbine, a first gearing connecting the circulatory turbine to the input shaft, a second gearing connecting the first gearing to the output sleeve of the converter through a unidirectional freewheel and a third gearing connecting the second gearing to an output member of the apparatus.

In one form of the invention the apparatus has the following features:

The second gearing comprises a coupling shaft connecting said first and second gearings and supported parallel to a shaft serving as the output shaft of the apparatus supported in the fixed casing. A gear carried by the coupling shaft meshes a gear free on the output shaft and connects a further gear free on the output shaft by means of a unidirectional freewheel, said further gear meshes a gear fixed to the output sleeve of the converter. The said further gear can be coupled either directly to the output shaft or through further gearing to the output shaft to provide a reducing gear and a reversing gear.

The invention will be further described by way of example with reference to the accompanying drawing wherein:

FIGS. 3, 4 and 6 are views in the axial direction of parts to be described;

FIG. 5 is an elevational view of the parts shown in FIG. 4;

Figure 1:
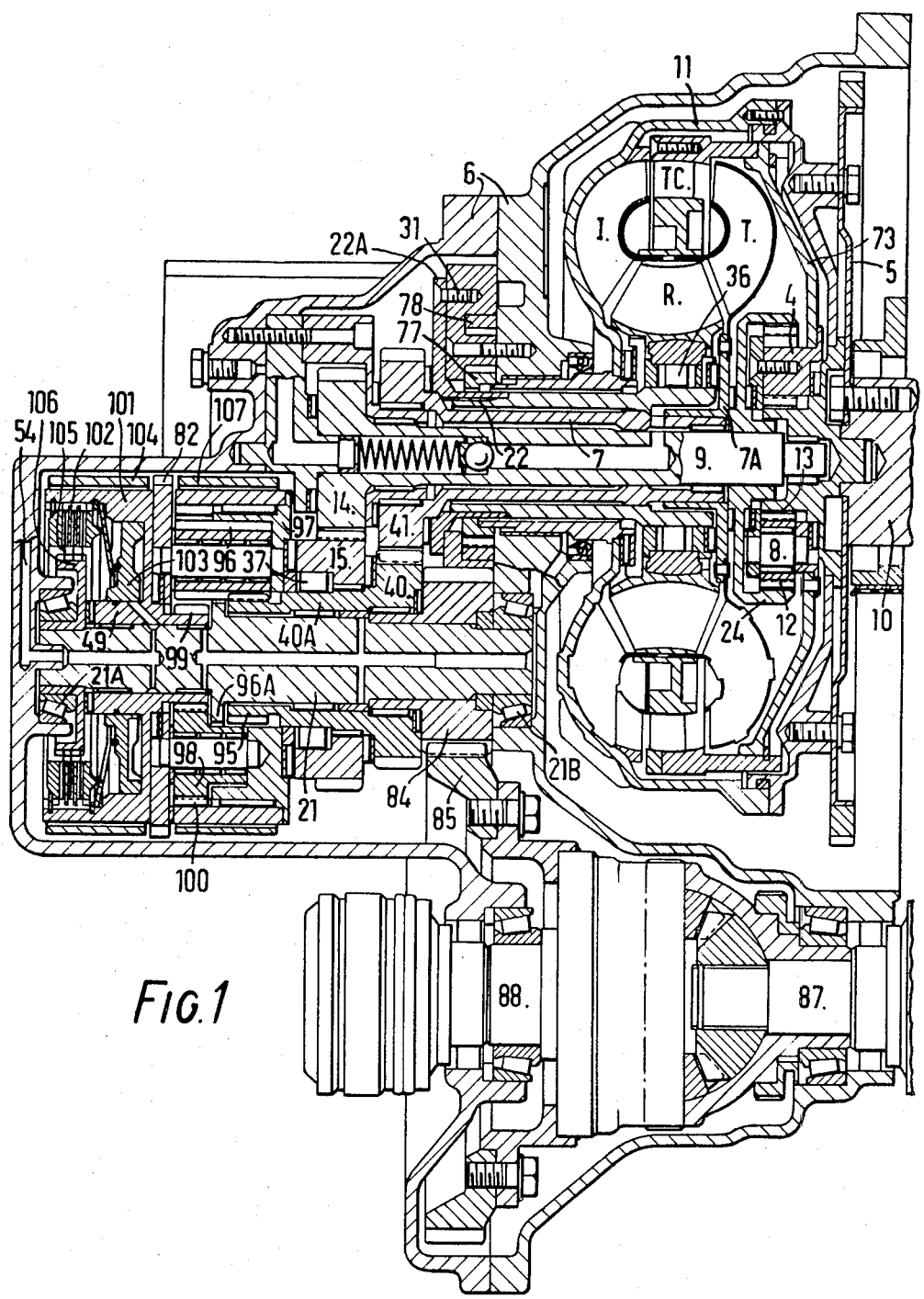
FIG. 1 is a sectional view of one form of the apparatus made in accordance with the invention.

In FIG. 1 there is an input shaft 10 and an output shaft 21. An impeller I of a torque converter is connected to the input shaft by a rotary housing 11 and starter drive plate 5. A circulatory turbine TC is mounted on a disc 73. The output shaft 21 is a layshaft which carries a gearwheel 84 which drives the final drive 85, 87, 88 of a transverse engine motor car.

An output turbine T is mounted on a hub 7A which is splined on an output sleeve 7. A reactor R engages a sleeve 22 by means of a unidirectional detent device 36. The sleeve 22 is fixed to the housing 6 by a plate 22A and bolts 31, the plate 22A being splined to the sleeve 22. The sleeves 7, 22 are coaxial and surround a coupling shaft 9. The output shaft 21 is a layshaft type shaft and is mounted in the housing 6 on bearings 21A, 21B on a fixed axis parallel to the axis of the coupling shaft 9 and offset axially from the torque converter.

Pinions 12 are carried by spindles 8 and are mounted in a carrier 4. The pinions 12 mesh with a ring gear 24 and with a sun gear 13. These parts constitute the first gearing. The disc 73 is attached to the carrier 4 and the sun gear to the rotary housing 11. The ring gear 24 is mounted on a coupling shaft 9. The sun gear 13 is carried by the rotary housing 11.

A gear 14 at the rear end of the coupling shaft 9 meshes with a gear 15 that surrounds the layshaft 21 coaxially therewith. A freewheel or unidirectional detent 37 transmit drive from gear 15 to sleeve 40A of a gearwheel 40 which engages a gearwheel 41 mounted on the output sleeve 7 of the converter. The sleeve 40a and gear 40 surround the shaft 21 coaxially therewith, the sleeve 40A being between the gear 15 and the shaft 21. These parts constitute a second gearing. Connection to a stationary part for reaction results from the gear supports in the stationary housing 6.

The gearwheel 40 is integral with a sun gear 95 on the sleeve 40A. The sun gear 95 meshes with pinions 96 mounted in a carrier 97. The pinions 96 mesh with pinions 98 also mounted in the carrier 97. Pinions 98 also mesh with a sunwheel 99 and a ring gear 100. The sunwheel 99 has a sleeve extension 49 formed integrally with a drum 101. The carrier 97 is attached to a flange 96A on the shaft 21. The pinions 96 and 98, sun gear 95 and ring gear 100 form a planetary reversing gear surrounding the shaft 21 coaxially therewith.

Figure 6:
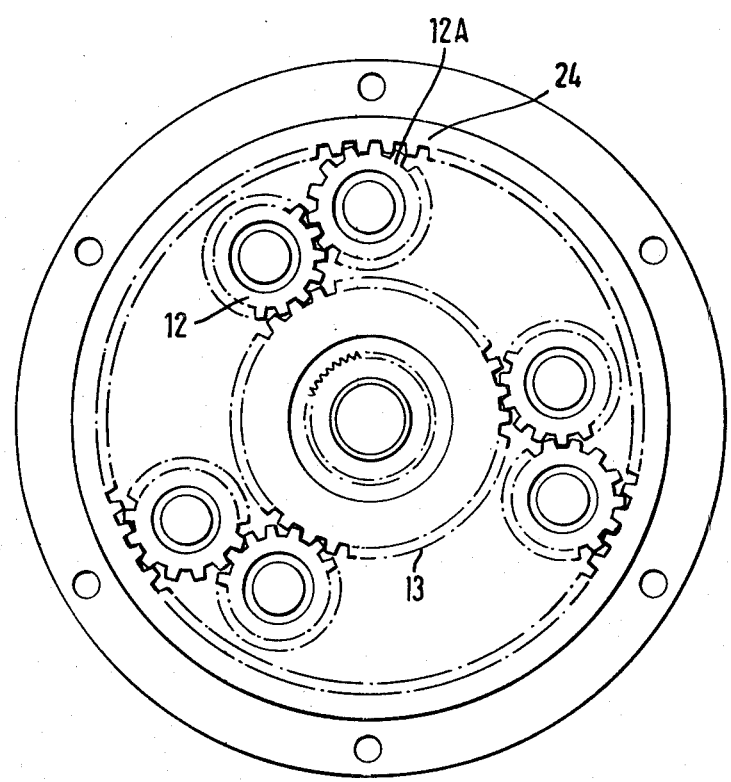

The drum 101 carries a set of clutch plates 102, a piston 103 and brakeband 104 which surrounds the drum 101. The plates 102 co-act with a set of clutch plates 105 which are carried by a hub 106 mounted on the output shaft 21. A brake 107 surrounds the ring gear 100. Teeth 82 on the carrier 97 are to provide a parking lock. Oil under pressure from a pump 77, 78 can be led to a piston 103 for engaging the clutch plates 102, 105 (or brake cylinders 108, 109 FIG. 6). Engagement of the clutch plate 102, 105 provides a direct 1:1 drive from the sun gear 95 (driven by the turbine T) to the output shaft 21. Engagement of the brake 107 by means of a piston 109 provides a reversed drive to the output shaft 21 through the planetary gear and engagement of the brake 104 by means of a piston 108 provides a reduced drive to the output shaft 21 through the planetary gear.

In the alternative construction shown in FIGS. 2 to 6 the planetary gear of FIG. 1 is replaced by a second layshaft 66 and associated gears. The layshaft 90 is mounted in the housing 6 on a fixed axis parallel to the shafts 9 and 21.

Figure 2:
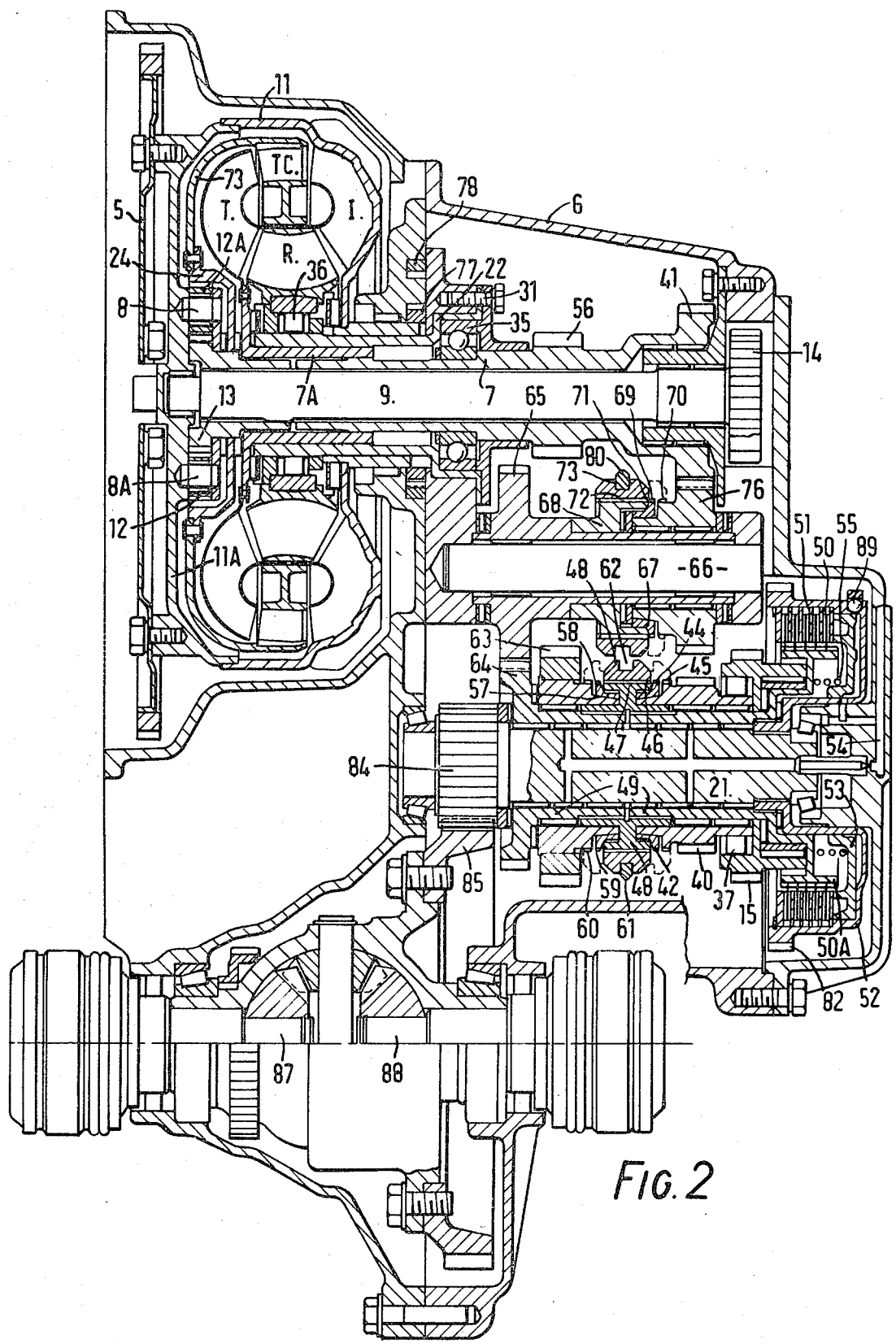
FIG. 2 is a sectional view of another form of the apparatus made in accordance with the invention, the section being taken on the planes A-B-C-D on FIG. 3.

In FIG. 2 the coupling shaft 9 carries a first gearwheel 14, the output sleeve 7 carries second and third gearwheels 56, 41. The second layshaft 66 carries fourth and fifth gearwheels 65, 76 rotatable thereon. The first layshaft 21 has sixth, seventh, eighth and ninth gearwheels 64, 63, 40, 15 rotatably mounted thereon. The first layshaft 21 also constitutes the output shaft.

Gearwheel 14 meshes with gearwheel 15. Gearwheel 56, 41 mesh with gearwheels 63, 76 respectively and gearwheel 41 also meshes with gearwheel 40. Gearwheel 65 meshes with gearwheel 64.

In FIG. 2 also three pairs of pinions 12, 12A are carried by spindles 8, 8A and are mounted in the rotary housing 11 and carrier 11A. The pinions 12A mesh with a ring gear 24 and the pinions 12 mesh with a sun gear 13. These parts constitute an alternative type of first gearing. The disc 73 is attached to the ring gear 24 and the sun gear 13 is mounted on the coupling shaft 9.

The gearwheel 40 carries a synchronising cone 42 and a synchronising disc has teeth 44 of known type. There are dog clutch teeth 45 on the gearwheel 40. Dog clutch teeth 46 engage teeth 47 carried by a part 48 attached to a sleeve 49 which carries a clutch member 50A. The member 50A carries clutch plates 50 engageable with plates 51 carried in clutch drum 52 mounted on the output shaft 21.

Fluid pressure from the pump 77, 78 can be applied to a piston 53 through a channel 54 to engage the plates. Springs 55 act to disengage the plates 50, 51. A ball valve 89, spring loaded towards its seat reduces the pressure as output speed is increased by reason of centrifugal force on the ball and spring.

Gear 56 meshes with gear 63 on the output sleeve 7. The gear 63 has the synchronising cone 57 to engage the plate 58 having teeth 59. The gear 63 has dog clutch teeth 60.

The member 48 can be moved by a fork 61 (FIG. 4) acting in a groove 62, so as to engage either teeth 45, 46 or 46, 60.

The gear 64 attached to sleeve 49 meshes with gear 65 mounted on the second layshaft 66 which is parallel to the shafts 9, 21 and offset therefrom. A gear 75 (FIG. 3) meshes with gear 41. Gear 41 carries a synchronising cone 67, a synchronising plate having teeth 69 and dog clutch teeth 70, 71. There are teeth 72 and groove 73 for the fork 80, (FIG. 4).

The gear ratio selector rods 74, 75 (FIGS. 4 and 5) are actuated by movement of part 77A, in slots 81, 79.

For Neutral the dog clutch teeth are disengaged and also the clutch plates 50, 51.

If teeth 45, 46 are engaged by sliding member 48 to the right (FIG. 2) and the clutch plates 50, 51 are engaged 'Forward' drive will take place through gears 14, 15, freewheel 37, 40A and gears 41, 40. Should drive from TC cease the freewheel 37 will over-run.

To engage 'Forward' from 'Neutral', the output sleeve 7 and the coupling shaft 9 will be rotating if the input shaft is rotating. The member 61 will be moved to the right but teeth 44 will 'baulk' movement in known manner until the speeds of teeth 45, 46 are synchronised by means of the cone 42 when movement may continue and engage 46 and 45. The sleeve 49 will now rotate and can be engaged with the output shaft 21 by engagement of plates 50, 51 so that drive will take place.

The second gearing of FIG. 2 comprises the parts 14, 15. Parts 40,41, 64,65, 56,63 form a third gearing in place of 96 etc. of FIG. 1.

If teeth 45, 46 are disengaged after release of plates 50, 51 the teeth 46, 60 may be synchonised and engaged and plates 50, 51 re-engaged. This provides a 'low gear' for 'engine braking' or for climbing unusually steep gradients.

Disengagement of 45, 46, 60 and engagement of 70, 71 provides a 'Reverse' drive.

The reverse gear train remains engaged i.e. dog clutch 70, 71 when park lock teeth 82 are engaged. This enables the park lock to be easily disengaged with engine and vehicle stationary and also avoids engagement of dog clutch teeth when selecting Reverse or Neutral from Park. Also if the engine is started in Park which is good practice, it ensures that the clutch plates 50, 51 are freed by rotation.

The selector arrangement is such that a remote control can be provided moving through an arc and requiring no additional movements in other directions. It enables a valve to be operated in a simple manner at appropriate positions to engage or disengage the plates 50, 51 and requires no slack or yielding devices.

In operation the torque converter coupling I, TC, T, R provides power transmission from the input 10 to the sleeve 7 and to the coupling shaft 9, during torque conversion, and to the sleeve 7 during coupling when freewheeling can take place at 37.

The apparatus shown in FIGS. 1 and 2 embody a second gearing 14, 15, 40, 41 mounted in a stationary part connecting the first gearing 12, 13, 24 and the circulatory turbine TC to the output sleeve 7 of the converter and the output turbine T through unidirectional freewheel 37. Further gearings enable different ratios, i.e. 'low' and 'reverse' to be obtained. The second gearing can be connected directly to the output shaft and provides a different ratio between the output shaft 21 and the output sleeve 7, to that between the output shaft 21 and the coupling shaft 9.

The first gearing having pinions 12, 12A shown in FIG. 2 and FIG. 5 is different from that disclosed in the British Pat. Nos. 1199521 and 1347045 and from that shown in FIG. 1. These types of gearing provides different ratios and the torque from the circulatory turbine may be divided in different proportions. A reduced proportion to the impeller and an increased proportion to the second gearing and output shaft enables a more constant input speed to be obtained and the variable blades of TC to be dispensed with. In provides an important development.

Figure 7:
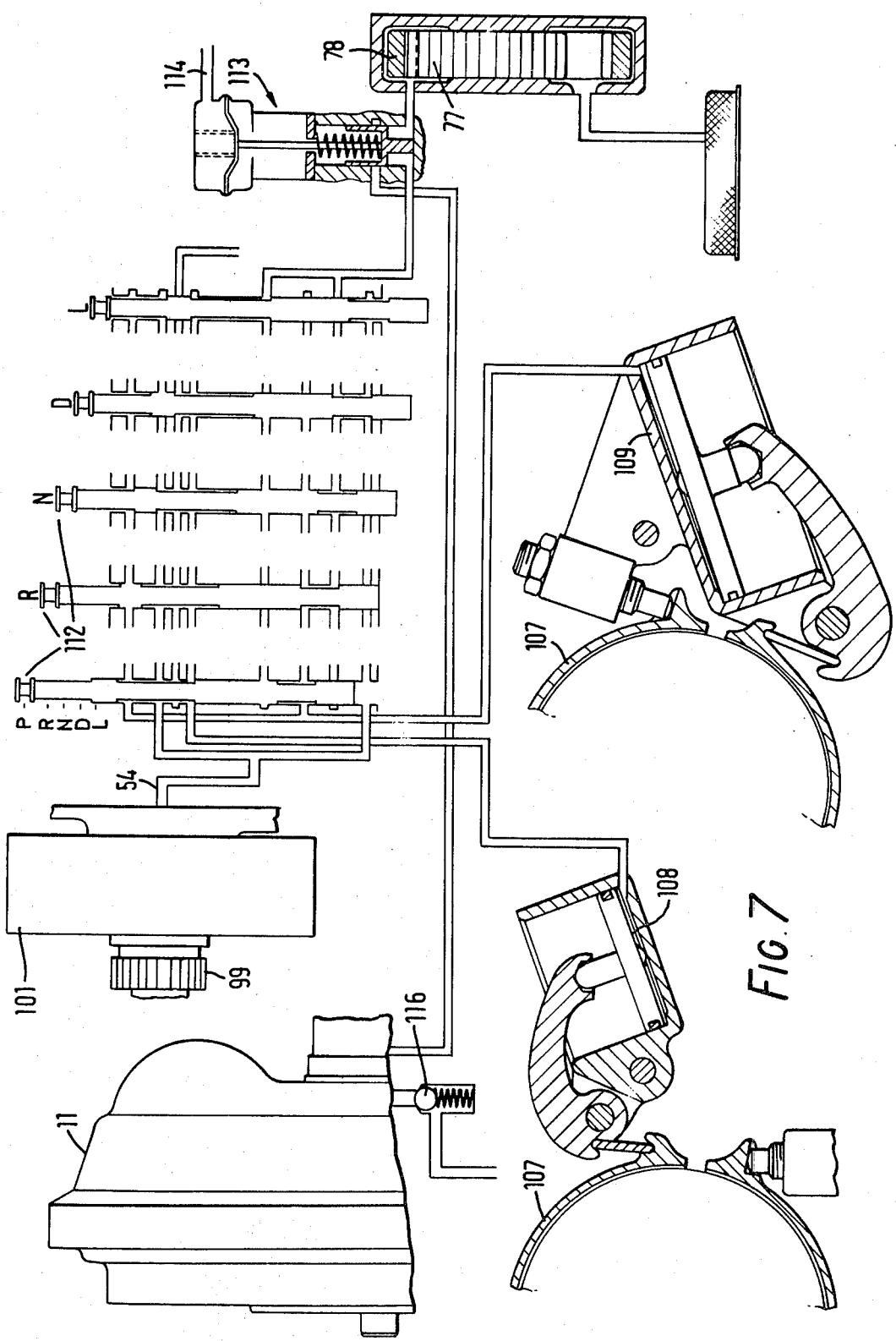
FIG. 7 shows a hydraulic circuit suitable for the apparatus shown in FIG. 1, and FIGS. 8 and 9 are details of parts shown in outline in FIG. 7.
Figure 9:
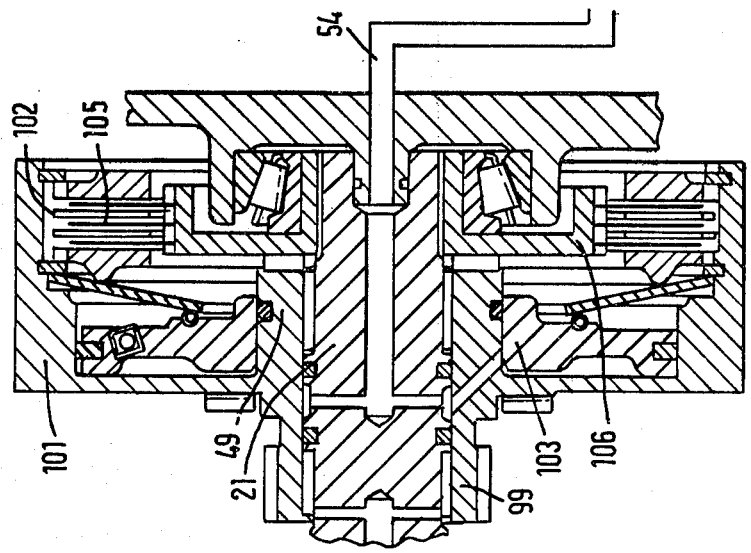
Figure 8:
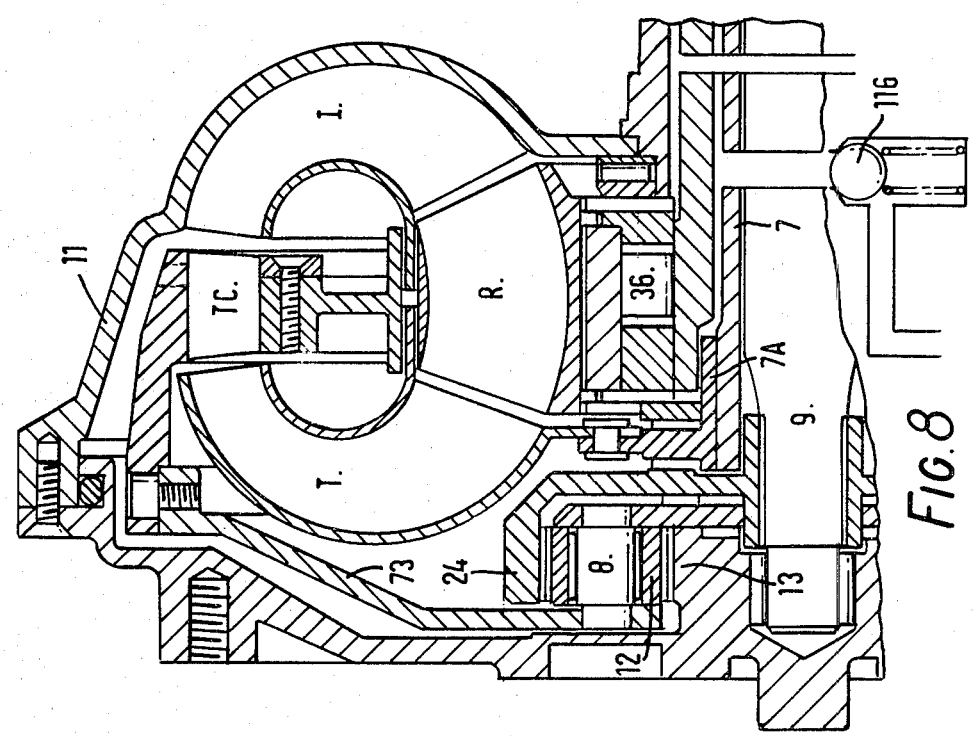

FIG. 7 shows a hydraulic control circuit for the apparatus of FIG. 1. Five different positions of a selector valve is shown diagrammatically at 112. 113 is a line pressure control valve connected at 114 to the engine manifold for vacuum.

The vacuum varies with throttle opening and speed and varies the line pressure in known manner. A non-return valve 116 (also shown in FIG. 1) controls the exit of fluid from the converter and controls the pressure of fluid in the converter. The valve 113 serves to maintain the pressure to operate the clutches and brakes and exhausts to the converter when maximum fluid pressure therein is reached. When the valve 113 is in the 'R' position it connects fluid pressure to piston 109 and exhausts pressure from piston 103 and cylinder 108. When 113 is moved to 'N' it exhausts 103, 108, 109. When 113 is moved to 'D' it exhausts 108, 109 and connects pressure to 103. When 113 is moved to 'L' it exhausts 103, 109 and connects pressure to 108.

I claim:

1. A power transmission apparatus comprising a torque converter having an input shaft, an impeller connected to the input shaft, an output sleeve, a layshaft parallel to said input shaft, an output member, an output turbine connected to said output sleeve, a reactor and a circulatory turbine, a first gearing connecting the circulatory turbine (TC) to the input shaft to transmit driving torque thereto, a unidirectional freewheel, a second gearing connecting the first gearing to the converter output sleeve through said unidirectional freewheel and a third gearing connecting the second gearing to said layshaft; a coupling shaft, said second gearing comprising first and second gearwheels the first of which is carried by said output sleeve and the second is carried by said coupling shaft which is coaxial with said output sleeve; third and fourth gearwheels carried by said layshaft, said first and second gearwheels meshing with said third and fourth gearwheels the third gearwheel being connected with said third gearing and the fourth gearwheel is connected with the third gearwheel by said freewheel; and means drivably connecting the layshaft with said output member.

2. An apparatus as claimed in claim 1 including a clutch (102, 105) and first and second brakes (104, 107) and a ring gear (100) and wherein the third gearing is a planetary gearing having pinions geared to a sun gear connected with said clutch and first brake (104) and geared to said ring gear by said pinions said ring gear having a brake whereby the sun gear can be held stationary for producing reverse drive and the sun gear can be clutched to the output member to produce a direct ratio drive.

3. Apparatus as claimed in claim 1, wherein said first gearing comprises a set of planetary pinions (12, 12A) meshed with a sun wheel (13) and with a ring gear (24), said pinions being carried by the input shaft, said ring gear (24) carrying the circulatory turbine (TC), and said sun wheel is carried by said coupling shaft (9).

* * * * *